United States Patent [19]
Sato

[11] B 3,988,819
[45] Nov. 2, 1976

[54] APPARATUS FOR INSERTING SMALL-DIAMETER PIPE INTO LARGE-DIAMETER PIPE AND/OR PULLING THE FORMER OUT OF THE LATTER

[75] Inventor: Toshiyuki Sato, Takatsuki, Japan

[73] Assignee: Kabushiki Kaisha Suiken, Osaka, Japan

[22] Filed: Sept. 5, 1974

[21] Appl. No.: 503,436

[44] Published under the second Trial Voluntary Protest Program on February 24, 1976 as document No. B 503,436.

[30] Foreign Application Priority Data
Sept. 7, 1973  Japan.............................. 48-105446

[52] U.S. Cl. ................................................ 29/237
[51] Int. Cl.² ........................................ B23P 19/04
[58] Field of Search...................... 29/237, 282, 234; 254/29 R

[56] References Cited
UNITED STATES PATENTS

| | | | |
|---|---|---|---|
| 889,315 | 6/1908 | Kenyon | 254/29 R |
| 3,426,417 | 2/1969 | Austin | 29/237 |
| 3,653,115 | 4/1972 | Perkins | 29/237 |
| 3,710,427 | 1/1973 | Doty | 29/237 |

Primary Examiner—James L. Jones, Jr.
Attorney, Agent, or Firm—Edwin E. Greigg

[57] ABSTRACT

Apparatus comprising a first frame having first pipe holders for gripping a large-diameter pipe and a second frame having second pipe holders for gripping a small-diameter pipe. The first frame and the second frame are movable relative to each other to insert the small-diameter pipe into the large-diameter pipe and/or pulling the former out of the latter.

11 Claims, 8 Drawing Figures

3,988,819

APPARATUS FOR INSERTING SMALL-DIAMETER PIPE INTO LARGE-DIAMETER PIPE AND/OR PULLING THE FORMER OUT OF THE LATTER

BACKGROUND OF THE INVENTION

The present invention relates to an apparatus for inserting a small-diameter pipe into a large-diameter pipe and/or pulling the former out of the latter.

An apparatus has not been provided yet which is specifically designed for inserting a small-diameter pipe into a large-diameter pipe or withdrawing the former from the latter. Accordingly such work has been conducted by a very primitive method generally using the following device.

As illustrated in FIG. 8, if a small-diameter pipe 2 is to be inserted into a large-diameter pipe 1, for instance, an inverted U-shaped pivotable member 39 is engaged with the large-diameter pipe 1, and one end of a wire 40 wound around the small-diameter pipe 2 is fixed to the pivotable member 39. The pivotable member 39 is then pivotally moved by the hands in the direction of the arrow in the drawing to insert the small-diameter pipe 2 into the large-diameter pipe 1.

However, the conventional device requires a troublesome procedure to wind the wire 40 around the small-diameter pipe 2 and to remove the wire 40 from the pipe 2 after the completion of work and involves another drawback that pivotable members of various sizes must be prepared in accordance with the diameters of the pipes to be handled. Furthermore when the small-diameter pipe 2 is to be inserted in place, the pull on the wire 40 brings the small-diameter pipe 2 out of alignment with the large-diameter pipe 1, making it impossible to insert the small pipe 2 into the end of the large pipe 1 while maintaining both pipes 1 and 2 in alignment with each other. With the known device, therefore, it is difficult to carry out the work smoothly, or the small-diameter pipe 2 is inserted into the large-diameter pipe 1 out of alignment therewith.

SUMMARY OF THE INVENTION

The present invention has overcome the foregoing drawbacks heretofore experienced and provides an apparatus for inserting a small-diameter pipe into a large-diameter pipe or withdrawing the former from the latter easily, while maintaining both pipes in alignment with each other and without using any additional apparatus whether the pipes are large or small in diameter.

The apparatus according to the present invention comprises a first frame having two first pipe holders for gripping a large-diameter pipe, at least one of the first pipe holders being movable in a direction which is perpendicular to the longitudinal axis of the large-diameter pipe and a rectilinear line linking a contact point of the first frame on the outer periphery of the large-diameter pipe with a contact point of the other first pipe holder on the outer periphery of the large-diameter pipe and which crosses said rectilinear line at the contact point of the first frame, a second frame having two second pipe holders for gripping a small-diameter pipe, at least one of the second pipe holders being movable in a direction which is perpendicular to the longitudinal axis of the small-diameter pipe and a rectilinear line linking a contact point of the second frame on the outer periphery of the small-diameter pipe with a contact point of the other second pipe holder on the outer periphery of the small-diameter pipe and which crosses said rectilinear line at the contact point of the second frame, and a driving means for moving the second pipe holders respectively relative to the corresponding first pipe holders in a direction parallel to the longitudinal axis of the pipes so as to move the small-diameter pipe relative to the large-diameter pipe.

Thus by suitably moving the movable first pipe holder and second pipe holder, the distance between the first pipe holders and that between the second pipe holders can be changed, this making it possible for the apparatus to effectively grip the large-diameter pipe and the small-diameter pipe whether they are diametrically large or small. In fact, various pipes of different diameters can be handled by one apparatus.

When the movable first pipe holder is suitably moved to bring the first pipe holder into contact with the outer peripheral surface of the large-diameter pipe and to cause both the first pipe holders to grip the large-diameter pipe, two rectilinear lines extending from the contact point of first frame on the outer peripheral surface of the large-diameter pipe to the points of contact between the first pipe holders and the outer peripheral surface of the large-diameter pipe are at a right angle with each other. Consequently the first pipe holders effectively grip the large-diameter pipe on its diametrically opposite sides. For the same reason, both the second pipe holders effectively grip the small-diameter pipe on its diametrically opposite sides. In this state, the driving means is operated to move the second pipe holders relative to the corresponding first pipe holders in a direction parallel to the longitudinal axis of the pipes and to thereby insert the small-diameter pipe into the large-diameter pipe or withdraw the former from the latter, without permitting any misalignment between the two pipes. Accordingly, the small-diameter pipe can be inserted or withdrawn reliably, easily and smoothly as desired.

Since the present apparatus is usable for large and small pipes insofar as they have a length of straight pipe portion which will permit the first and second pipe holders to grip the pipes, it is serviceable relatively easily and reliably when inserting a small-diameter bent into a straight large-diameter pipe or into a large-diameter bent or when withdrawing the former from the latter.

An object of this invention is to provide an apparatus by which a small-diameter pipe can be inserted into or withdrawn from a large-diameter pipe easily and reliably while both pipes are being maintained in alignment with each other, the apparatus being capable of carrying out the above operation without using any additional apparatus irrespective of the diameter of the pipes.

Another object of this invention is to provide an apparatus including projections which are pressed against and wedged into the outer peripheral surface of a large-diameter pipe or small-diameter pipe to firmly grip the pipe so that the small-diameter pipe can be inserted into or withdrawn from the large-diameter pipe reliably.

Still another object of this invention is to provide an apparatus by which a small-diameter pipe can be inserted into or withdrawn from a large-diameter pipe easily and rapidly.

Other objects and advantages of this invention will become apparent from the following description.

DESCRIPTION OF THE PREFERRED EMBODIMENTS

Figure 1:
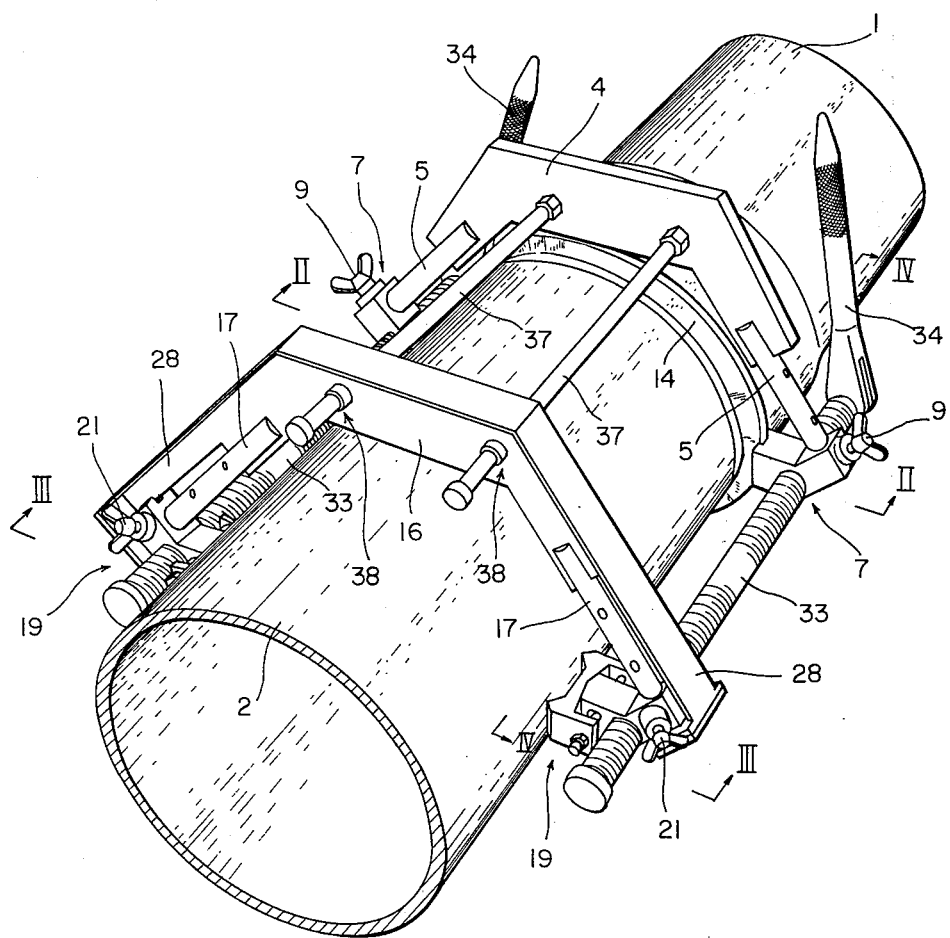
FIG. 1 is a perspective view showing an embodiment of this invention.
Figure 2:
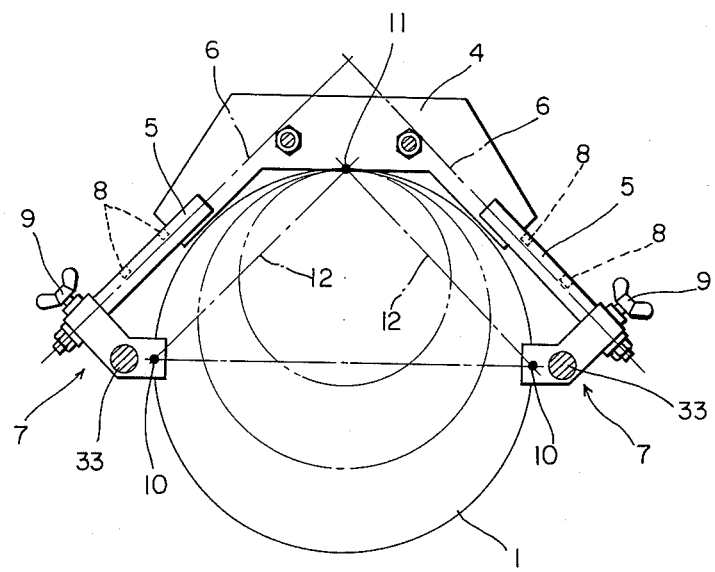
FIG. 2 is a view in section taken along the line II—II in FIG. 1.
Figure 3:
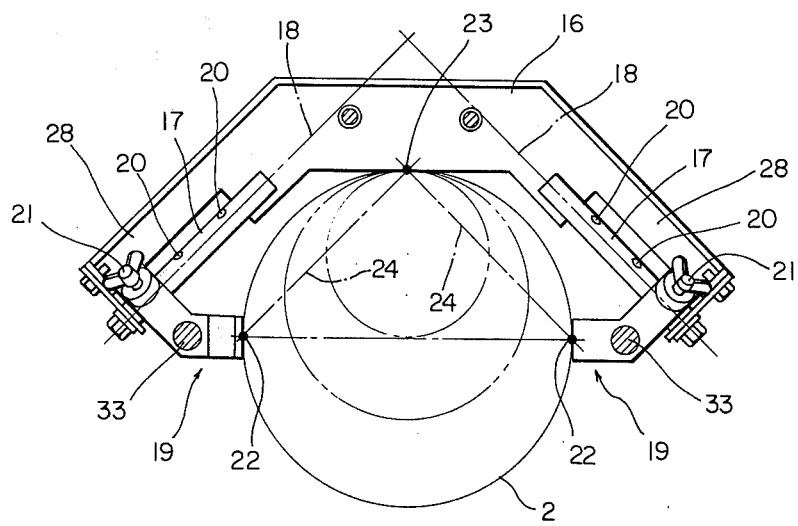
FIG. 3 is a view in section taken along the line III—III in FIG. 1.
Figure 4:
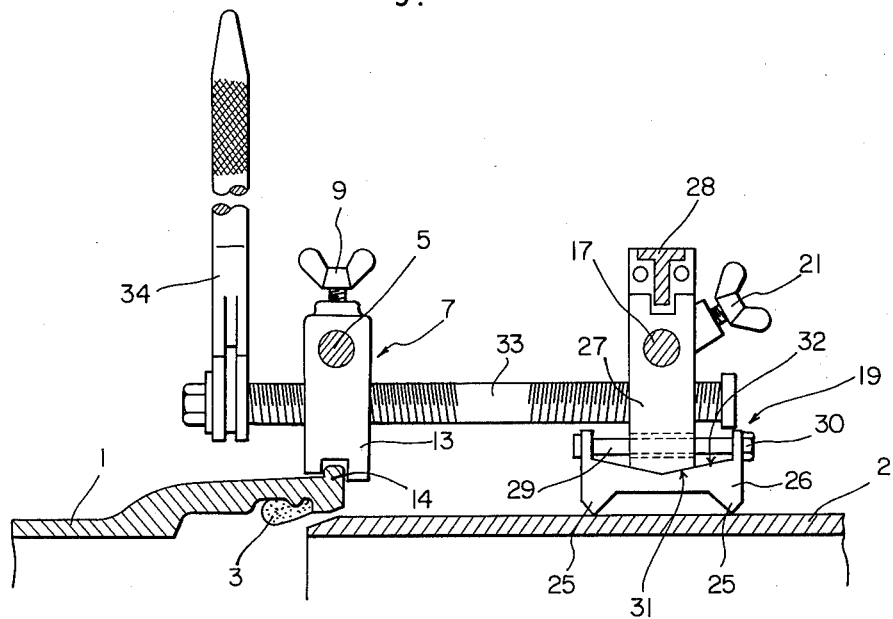
FIGS. 4 and 5 are views in section taken along the line IV—IV in FIG. 1.
Figure 5:
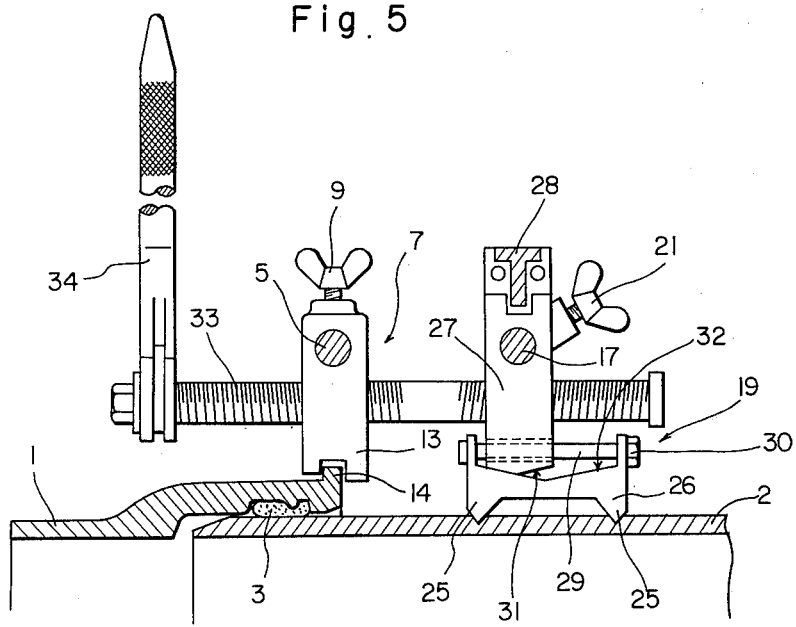

The present invention will be described below with reference to preferred embodiments. The drawings show a large-diameter pipe 1 for transporting various liquids and gases and a small-diameter pipe 2 which can be inserted into one end of the large-diameter pipe 1. An annular sealing member 3 is placed between the pipes 1 and 2. As shown in FIG. 4 and 5, the the large-diameter pipe 1 has a locally enlarged diameter only at its one end for receiving the small-diameter pipe 2, or it may alternatively have a large-diameter throughout its entire length.

Figure 7:
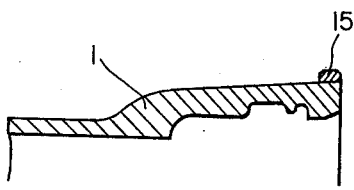
FIG. 7 is a view in section showing a modified large-diameter pipe.
Figure 8:
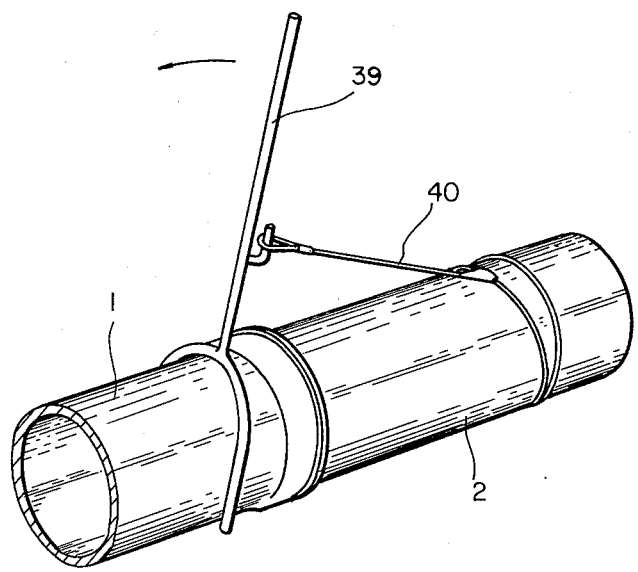
FIG. 8 is a perspective view showing a conventional device.

A first frame 4 has first guide bars 5, 5 of the same length fixed to its opposite ends. Both first guide bars 5, 5 are so arranged that the longitudinal axes 6, 6 thereof intersect each other at right angles. The first frame 4 therefore resembles an isoseles triangle in its entirety. First pipe holders 7, 7 for gripping the large-diameter pipe 1 are slidably mounted on the first guide bars 5, 5 respectively and can be secured thereto by the engagement of bolts 9, 9 in bores 8, 8, . . . formed in the first guide bars 5, 5. Accordingly when the first pipe holders 7, 7 are slid on the first guide bars 5, 5 with the first frame 4 placed on the outer peripheral surface of the large-diameter pipe 1, the contact points 10, 10 of distal ends of the first pipe holders 7, 7 on the large-diameter pipe 1 move along two rectilinear lines 12, 12 extending at right angles to the longitudinal axis of the large-diameter pipe 1 and intersecting each other at right angles at a point 11 where the first frame 4 is in contact with the outer peripheral surface of the large-diameter pipe 1. Each of the first pipe holders 7, 7 comprises a bifurcated member 13 having a bifurcated distal end. The bifurcated terminal end portions 13, 13 engage a flange 14 on the outer periphery of the large-diameter pipe 1 to grip the large-diameter pipe 1. In the case where the present apparatus is used for a large-diameter pipe which is not formed with a flange integral therewith, an annular member 15 corresponding to the flange 14 is fitted around or fixed to the large-diameter pipe 1 as seen in FIG. 7.

A second frame 16 has second guide bars 17, 17 of the same length as the first guide bars 5 and 5 fixed to its opposite ends. Both the second guide bars 17, 17 are so arranged that their longitudinal axes 18, 18 intersect each other at right angles. The second frame in its entirety therefore resembles an isosceles triangle. Second pipe holders 19, 19 for gripping the small-diameter pipe 2 are slidably mounted on the second guide bars 17, 17 respectively and can be secured to the second guide bars 17, 17 by the engagement of bolts 21, 21 in bores 20, 20, . . . formed in the guide bars 17, 17. Accordingly when the second pipe holders 19, 19 are slid on the second bars 17, 17, with the second frame 16 placed on the outer peripheral surface of the small-diameter pipe 2, the contact points 22, 22 of the distal ends of the second pipe holders 19, 19 on the small-diameter pipe 2 move along two rectilinear lines which extend at right angles with the longitudinal axis of the small-diameter pipe 2 and intersect each other at right angles at a point 23 where the second frame 16 is in contact with the outer peripheral surface of the small-diameter pipe 2.

Each of the second pipe holders 19, 19 has the following specific construction. The second pipe holder 19 comprises a projection 26 having a plurality of wedge portions 25, . . . and a pressing member 27. The pressing member 27 is mounted on the second guide bar 17 and is in engagement with a guide 28 which is integral with the second frame 16. By means of bolt 29 and nut 30, the projection 26 is mounted on the end of the pressing member 27 and is movable relative to the pressing member 27. The portions of the pressing member 27 and of projection 26 which contact each other have two camming surfaces 31 and 32 extending in opposite directions, such that when the pressing member 27 is moved in a direction parallel to the longitudinal axis of the small-diameter pipe 2, both camming surfaces 31 and 32 act to force the projection 26 toward the center of the small-diameter pipe 2 relative thereto. In other words, where the projection 26 and pressing member 27 contact each other, cam means in the form of the two surfaces 31 and 32 are provided to enable the pressing member 27 to press the projection 26 against the outer peripheral surface of the small-diameter pipe 2 when the pressing member 27 is moved relative to the projection 26, consequently wedging the wedge portions 25, . . . into the peripheral surface of the pipe 2 to grip the small-diameter pipe 2.

The drawings further show two bolts 33, 33 each of which has opposite ends screw-threaded in opposite directions. The threaded ends are screwed into the bifurcated member 13 of the first pipe holder 7 and the pressing member 27 of the corresponding second pipe holder 19 respectively. Each bolt 33 is provided with a ratchet mechanism 34 at its one end. When the mechanisms 34, 34 are driven to rotate both the bolts 33, 33, the bifurcated member 13, 13 and pressing members 27, 27 are moved toward or away from each other. In other words, the driving means comprising the two bolts 33, 33 and two ratchet mechanisms 34, 34 renders the second pipe holders 19, 19 movable relative to the first pipe holders 7, 7 in a direction parallel to the longitudinal axis of the large and small pipes 1 and 2 to move the small-diameter pipe 2 relative to the large-diameter pipe 1.

Figure 6:
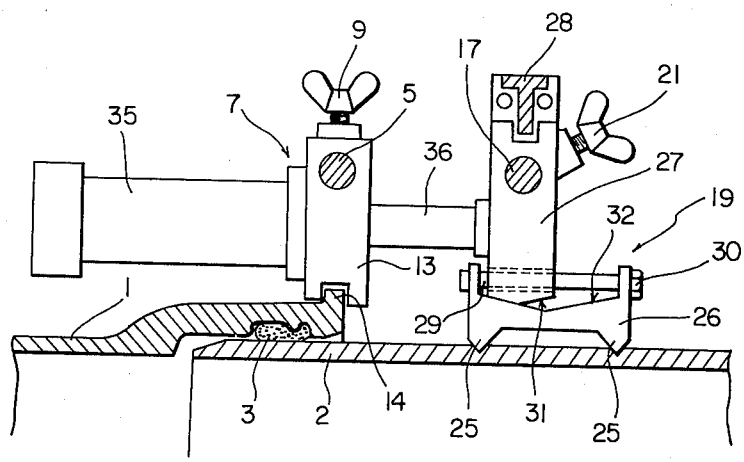
FIG. 6 is a view in section showing another embodiment.

Instead of using the bolts 33, 33 and ratchet mechanisms 34, 34 as the above-mentioned driving means, various other means are likewise employable. For example, hydraulic cylinders are usable as illustrated in FIG. 6. Two hydraulic cylinders 35, 35 are secured to the bifurcated members 13, 13 of the first pipe holders 7, 7, with their cylinder rods 36, 36 extending through the bifurcated members 13, 13 and connected at the distal ends thereof to the pressing members 27, 27 of the corresponding second pipe holders 19, 19. Both the hydraulic cylinders 35, 35 are operatively associated with each other for simultaneous operation.

Indicated at 37, 37 are two rods for connecting the first frame 4 and second frame 16 together as a unit. One end of each of the rods 37, 37 is secured to the first frame 4, and the other end is slidably inserted into a bore 38 formed in the second frame 16.

The present apparatus is used and operates as follows. When the small-diameter pipe 2 is to be inserted into one end of the large-diameter pipe 1, the annular sealing member 3 is first fitted into the large-diameter pipe 1 as illustrated in FIG. 4, and the small-diameter pipe 2 is inserted slightly into the end of the large-diameter pipe 1. The apparatus is placed on the pipes 1 and 2, with the bifurcated members 13, 13 engaged with the flange 14. The first pipe holders 7, 7 and second pipe holders 19, 19 are then moved along the guide bars 5, 5 and 17, 17 to the positions where the pipe holders 7, 7 and 19, 19 come into contact with the outer peripheral surfaces of the large and small pipes 1 and 2. The pipe holders are locked to the guide bars by the bolts 9, 9 and 21, 21. For the reason described hereinbefore, it follows that the two rectilinear lines connecting the contact points 10, 10 of the first pipe holders 7, 7 on the outer peripheral surface of the large-diameter pipe 1 to the contact point 11 where the first frame 4 is in contact with the outer peripheral surface of the large-diameter pipe 1 intersect each other at right angles. Consequently, both the first pipe holders 7, 7 effectively grip the large-diameter pipe 1 on its diametrically opposite sides. For the same reason, the second pipe holders 19, 19 effectively grip the small-diameter pipe 2 on its diametrically opposite sides. However, both the first pipe holders 7, 7 as well as both the second pipe holders 19, 19 need not be made movable, but only one of the first pipe holders 7, 7 and only one of the second pipe holders 19, 19 may be rendered movable to achieve the same result. Since the large and small pipes 1 and 2 are gripped by the first pipe holders 7, 7 and second pipe holders 19, 19 respectively, both pipes 1 and 2 can be reliably gripped regardless of the diameter thereof.

Subsequently, the handles of both ratchet mechanisms 34, 34 are manually pivotally operated at the same time. As both the bolts 33, 33 are thereby rotated, the second pipe holders 19, 19 are drawn toward the first pipe holders 7, 7 while the relative movement between the pressing member 27, 27 of the second pipe holders 19, 19 and the projections 26, 26 thereof forces the projections 26, 26 against the outer peripheral surface of the small-diameter pipe 2, thereby wedging the wedge portions 25, . . . of the projections 26, 26 into the surface of the small-diameter pipe 2. If the handles of the ratchet mechanisms 34, 34 are further pivotally moved continuously in this state, the pressing members 27, 27 and projections 26, 26 are pulled together toward the first pipe holders 7, 7, with the result that the small-diameter pipe 2 is inserted into the large-diameter pipe 2 by being moved along the longitudinal axis of the pipes 1 and 2 as shown in FIG. 5. Thus as far as the handles of the ratchet mechanisms 34, 34 are moved pivotally with the apparatus placed on the large and small pipes 1 and 2, the wedge portions 25, . . . of the projections 26, 26 are automatically wedged into the outer peripheral surface of the small-diameter pipe 2. The pipe 2 thus gripped is inserted into the large-diameter pipe 1 easily, rapidly and reliably while being maintained in alignment with the large pipe 1. After completion of insertion, the ratchet mechanisms 34, 34 are operated in the reverse direction to slightly rotate the bolts 33, 33 in the opposite direction, whereby the wedge portions 25, . . . are brought out of engagement with the outer peripheral surface of the small-diameter pipe 2. The apparatus is now readily removable from both pipes 1 and 2. Furthermore when the small-diameter pipe 2 inserted into the large-diameter pipe 1 is to be withdrawn therefrom, both bolts 33, 33 are rotated in a direction opposite to the direction of their rotation for insertion by operating the ratchet mechanisms 34, 34 in the reverse direction. Thus the small-diameter pipe 2 can be pulled out also easily and rapidly.

Although the embodiments described are usable for inserting the small-diameter pipe 2 into the large-diameter pipe 1 and also for withdrawing the former from the latter, the present apparatus may be adapted only for insertion or only for withdrawal. That is, if the driving means is operable only in the direction of insertion, the apparatus is serviceable only for insertion, whereas if it is operable only in the withdrawing direction, the apparatus is usable only for withdrawal. Likewise, in this case, slanting surfaces extending in only one direction may be used in place of the slanting surfaces 31 and 32 extending two directions. Whether the apparatus is to be made operable only for insertion or withdrawal or for both insertion and withdrawal may be determined as desired.

What I claim is:

1. An apparatus for advancing pipes telescopically into and/or out of engagement comprising first and second frame means arranged to straddle axially aligned pipes, said first and second frame means further including free end portions provided with slidable means serving to accommodate the frames of said apparatus to pipes of varying diameters, lockable jaw means associated with each of said slidable means arranged to be brought into contact with the respective pipes, parallel longitudinally disposed bar means associated with and extending through said lockable jaw means and actuator means carried by each of said bar means for advancing and retracting said telescopic pipes into and out of contact and vice versa.

2. An apparatus as claimed in claim 1, in which said slidable means are mounted in pairs on said first and second frame means respectively, each pair of said slidable means being adapted to slide in directions perpendicular to one another, whereby said lockable jaw means are brought into contact with the respective pipes at diametrically opposed sides at all times regardless of the diameters of the pipes.

3. An apparatus as claimed in claim 2, in which each of said lockable jaw means further include bifurcated terminal end portions.

4. An apparatus as claimed in claim 3, in which at least a pair of said lockable jaw means are reciprocally associated with said bifurcated terminal end portions.

5. An apparatus as claimed in claim 3, in which at least one pair of the lockable jaw means include means complemental to means carried by said bifurcated terminal end portions.

6. An apparatus as claimed in claim 5, in which said complemental means comprise camming means.

7. An apparatus as claimed in claim 5, in which said bifurcated terminal end portion includes an oppositely extending camming zone.

8. An apparatus as claimed in claim 7, in which said one pair of the lockable jaw means which includes said complemental means are mounted on said second frame means arranged to straddle a small-diameter pipe while the lockable jaw means mounted on said first frame means which is arranged to straddle a large-diameter pipe include further bifurcated terminal end portions engageable with a flange on the outer periphery of the large-diameter pipe to grip the large-diameter pipe.

9. An apparatus as claimed in claim 1, in which said lockable jaw means are hydraulically actuated.

10. An apparatus as claimed in claim 1, in which said actuator means are ratchet operated.

11. An apparatus as claimed in claim 1, in which said first and second frame means are each substantially in the form of an isosceles triangle.

* * * * *